(12) United States Patent
Howell

(10) Patent No.: US 9,752,811 B2
(45) Date of Patent: Sep. 5, 2017

(54) REFRIGERATION CONTROLLER THAT REDUCES OPERATIONAL NOISE

(75) Inventor: David James Howell, Auckland (NZ)

(73) Assignee: WELLINGTON DRIVE TECHNOLOGIES LIMITED, Auckland (NZ)

( * ) Notice: Subject to any disclaimer, the term of this patent is extended or adjusted under 35 U.S.C. 154(b) by 865 days.

(21) Appl. No.: 13/984,399

(22) PCT Filed: Feb. 13, 2012

(86) PCT No.: PCT/NZ2012/000014
§ 371 (c)(1),
(2), (4) Date: Aug. 8, 2013

(87) PCT Pub. No.: WO2012/112057
PCT Pub. Date: Aug. 23, 2012

(65) Prior Publication Data
US 2013/0312439 A1  Nov. 28, 2013

(30) Foreign Application Priority Data

Feb. 16, 2011 (NZ) ........................... 591189
Jun. 28, 2011 (NZ) ........................... 593773

(51) Int. Cl.
*F25D 17/00* (2006.01)
*F25D 17/06* (2006.01)
*F25B 49/02* (2006.01)
*F25D 29/00* (2006.01)

(52) U.S. Cl.
CPC ............ *F25B 49/022* (2013.01); *F25D 29/00* (2013.01); *F25B 49/02* (2013.01); *F25B 2600/0251* (2013.01); *F25B 2600/111* (2013.01); *F25B 2600/112* (2013.01); *F25D 2700/02* (2013.01); *F25D 2700/04* (2013.01); *F25D 2700/12* (2013.01); *Y02B 30/743* (2013.01)

(58) Field of Classification Search
CPC ............ F25B 49/022; F25B 2600/0251; F25B 2600/111; F25B 2600/112; F25D 2700/02; F25D 2700/04; F25D 2700/12
See application file for complete search history.

(56) References Cited

U.S. PATENT DOCUMENTS

2004/0007000 A1* 1/2004 Takeda ...................... A61L 9/22
62/78
2006/0111815 A1   5/2006 Schanin et al.
2008/0077275 A1* 3/2008 Merwarth ............... F25D 29/00
700/240

FOREIGN PATENT DOCUMENTS

JP   05-157431   6/1993
JP   07-190468   7/1995

OTHER PUBLICATIONS

International Search Report, PCT/NZ2012/000014, Jul. 19, 2012.

* cited by examiner

*Primary Examiner* — Dominick L Plakkoottam
*Assistant Examiner* — Daniel C Comings
(74) *Attorney, Agent, or Firm* — Young & Thompson

(57) ABSTRACT

A refrigeration controller within a retail refrigeration cabinet controls the temperature (502) so that it approaches the maximum allowable temperature by using the most efficient fan speed for loading and time of day (507) but is varied by customer presence (505) to adhere to an algorithm reducing the noise (506) created by such machines while still creating sufficient cooling to remain within the maximum temperature while providing acceptable power economy.

7 Claims, 5 Drawing Sheets

REFRIGERATION CONTROLLER THAT REDUCES OPERATIONAL NOISE

TECHNICAL FIELD OF THE INVENTION

The invention generally relates to refrigeration and heating systems for consumable products where a fan circulates air over an evaporator and/or a condenser of a refrigeration system or a heating system.

More particularly the invention relates to minimisation of the operating noise emitted by such systems.

BACKGROUND ART OF THE INVENTION

Heating and cooling systems of this type have a refrigerant compressor, a condenser which condenses the refrigerant from gas to liquid, and an evaporator which allows the refrigerant liquid to evaporate back to gas. For those with appreciable heating or cooling power there will be fans to circulate air past the condenser and the evaporator, to increase their efficiency.

The compressors and fans used by such coolers or heaters generate noise when in operation. This may be found objectionable by customers, particularly in quieter environments such as offices, or where large numbers of coolers are found together such as in convenience stores where there may be ranks of cabinet coolers and some display freezers. Often the dominant source of noise for such coolers is the condenser fan, which must be exposed to the outside environment for good cooling performance in a refrigerator, and thus is difficult to isolate acoustically from the customer.

The compressor and condensor fan will operate to bring the cooler interior down to the setpoint cutoff temperature set by the temperature controller and will then switch off, allowing the interior to slowly rise in temperature until it reaches the maximum acceptable interior temperature, when the compressor will turn on again. While the compressor is operating the condensor fan will create noise.

Where the refrigerator is a cabinet cooler one means of reducing condenser fan noise is to increase the temperature setpoint of the refrigerator interior, thus reducing the amount of time that the compressor must operate to bring the interior to down to the setpoint and the operating duty cycle of the fan and hence the average noise level. However this is incompatible with serving product at the ideal consumption temperature, and it does not reduce the peak noise. Another means is to specify fans of different size or operating speed, however this imposes a tradeoff between reduced thermal capacity and efficiency of the refrigeration system or increased bulk and cost. Other means include the use of low-noise fan designs and acoustic baffles, however these have limited efficacy and may reduce performance.

There is therefore a need for a means of minimising objectionable fan noise while people are in the vicinity of the cooler, while maintaining the thermal capacity of the refrigeration system.

U.S. Pat. No. 6,745,581 relates to historic control of a refrigeration system in which the system operates in energy saving mode based on what traffic has gone before. In the energy saving mode the temperature extremes are relaxed. The system includes person detection and door opening detection, and control of lights and fans. The latter is on a timed on/off basis.

The present invention provides a solution to this and other problems which offers advantages over the prior art or which will at least provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein; this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

SUMMARY OF THE INVENTION

In one aspect the invention provides a refrigeration control system for a refrigeration unit having a refrigeration cabinet volume capable of being maintained at a temperature below ambient temperature, a compressor capable of compressing refrigerant, a condenser capable of cooling refrigerant and an external fan or fans capable of circulating air over the condenser, an evaporator capable of cooling the internal cabinet volume, an internal fan or fans capable of circulating air over the evaporator, a sensor detecting the refrigeration unit internal cabinet temperature, a sensor capable of detecting the presence of humans at the refrigeration cabinet, a controller capable of controlling the fans and compressor in response to the sensors and anticipated actuation of the sensors and wherein the controller has means to adjust the target temperature of the refrigeration cabinet volume, and the controller being capable of controlling at least one of the external fans between two or more operating speeds independently of the operating state (ON or OFF) of the compressor, such that for a given refrigeration cabinet volume target temperature setting, the fan speed selected in the detected or anticipated presence of human traffic is lower than the speed selected in otherwise identical operating conditions in the absence of human traffic.

Preferably the refrigeration unit has an external ambient temperature sensor and the condenser fan speed is controlled by the controller at least partially as a function of measured external ambient temperature.

Preferably the controller is also capable of controlling the internal fan speed such that for a given target temperature setting, the internal fan speed selected in the detected or anticipated presence of human traffic is lower than the speed selected in otherwise identical operating conditions in the absence of human traffic.

Preferably the controller is capable of controlling both the external fan speed and the compressor speed.

Preferably the controller is capable of controlling both the external and the internal fan speeds such that for a given refrigeration cabinet volume target temperature setting, at least one of the fan speeds selected in the detected or anticipated presence of human traffic is lower than the speed selected in otherwise identical operating conditions in the absence of human traffic.

Preferably the controller additionally provides a managed fan speed providing greater efficiency in terms of power used versus heat removed than would be achieved using maximum fan speed.

Preferably the reduced fan speed is managed so as to be as low as possible consistent with full evaporation and condensation of the refrigerant in the heat exchangers.

Preferably the controller is capable of storing a history of past human presence versus time and is capable of operating the managed rate in the first instance in accordance with predictions from the stored history.

In another aspect the invention provides a method of operating a refrigeration unit having a refrigeration cabinet volume to be maintained at a temperature below ambient temperature, a compressor compressing refrigerant, a condenser cooling refrigerant and an external fan or fans circulating air over the condenser, an evaporator cooling the internal cabinet volume, and an internal fan or fans circulating air over the evaporator by: providing a controller controlling at least one of the external fans between two or more operating speeds, detecting or predicting at the controller the presence of human traffic in the vicinity of the refrigeration unit, providing at the controller for means of adjusting the target temperature of the refrigeration cabinet volume, and controlling using the controller at least one of the external fans between two or more operating speeds, such that for a given target temperature setting of the cabinet volume, the fan speed selected in the detected or anticipated presence of human traffic is lower than the speed selected in otherwise identical operating conditions in the absence of human traffic In a yet further aspect the invention provides a low noise refrigerator comprising:

a refrigeration controller, a refrigeration cabinet, having an interior which is capable of being maintained at a temperature below ambient temperature, a compressor capable of compressing refrigerant, a condenser capable of cooling refrigerant, and an external fan or fans capable of circulating air over the condenser, an evaporator capable of cooling the interior of the cabinet, an internal fan or fans capable of circulating air over the evaporator, a temperature sensor capable of detecting the refrigeration unit internal cabinet temperature, a human traffic sensor capable of detecting the presence of human traffic in the vicinity of the refrigeration unit, the refrigeration controller having inputs from the sensors and having a clock function, the refrigeration controller is capable of responding to both the detected presence of human traffic from the human traffic sensor, and the predicted presence of human traffic from stored information, the refrigeration controller has means to adjust the target temperature of the interior of the refrigerator cabinet, being the temperature to which the cabinet volume should be cooled, and the refrigeration controller is programmed to control at least one of the external fans between two or more operating speeds independently of the operating state (ON or OFF) of the compressor, such that for a given target temperature setting, the fan speed selected in the detected or predicted presence of human traffic is lower than the speed selected in otherwise identical operating conditions in the absence of human traffic.

In its most preferred form, the invention includes a refrigeration controller within a retail refrigeration cabinet which has a clock to assist in monitoring and recording human traffic at different times of the, and an algorithm which controls the internal cabinet temperature so that it approaches the maximum allowable temperature by using the most efficient fan speed for loading and time of day but is varied by (detected or predicted) customer presence to adhere to a reduced noise regime by setting the fan speed to the lowest efficient speed to reduce fan noise created by such machines while still creating sufficient cooling to remain within the maximum temperature and providing acceptable power economy.

These and other features of as well as advantages which characterise the present invention will be apparent upon reading of the following detailed description and review of the associated drawings.

DESCRIPTION OF THE INVENTION

Figure 6:
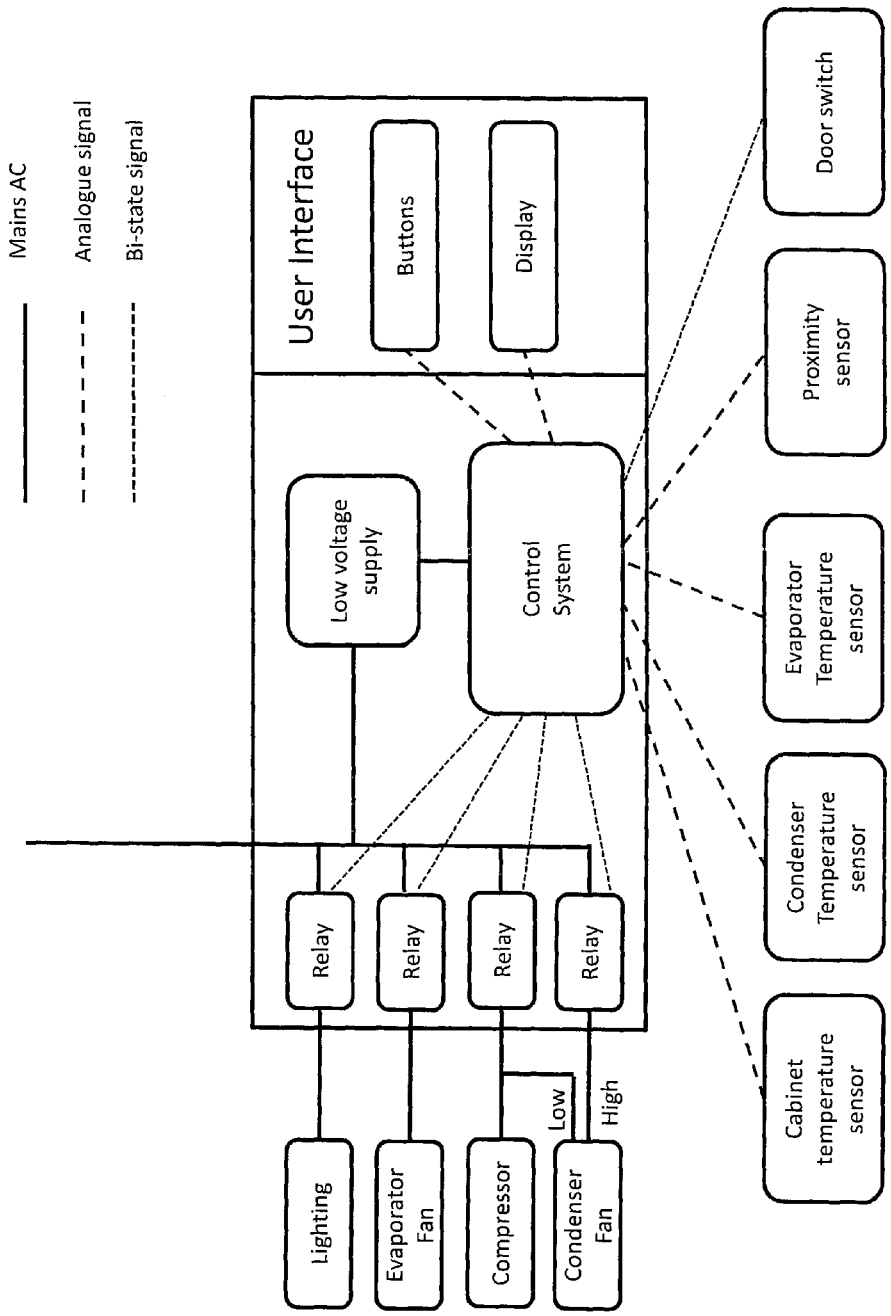
FIG. 6 is a block diagram of refrigeration control system of Embodiment 1
Figure 7:
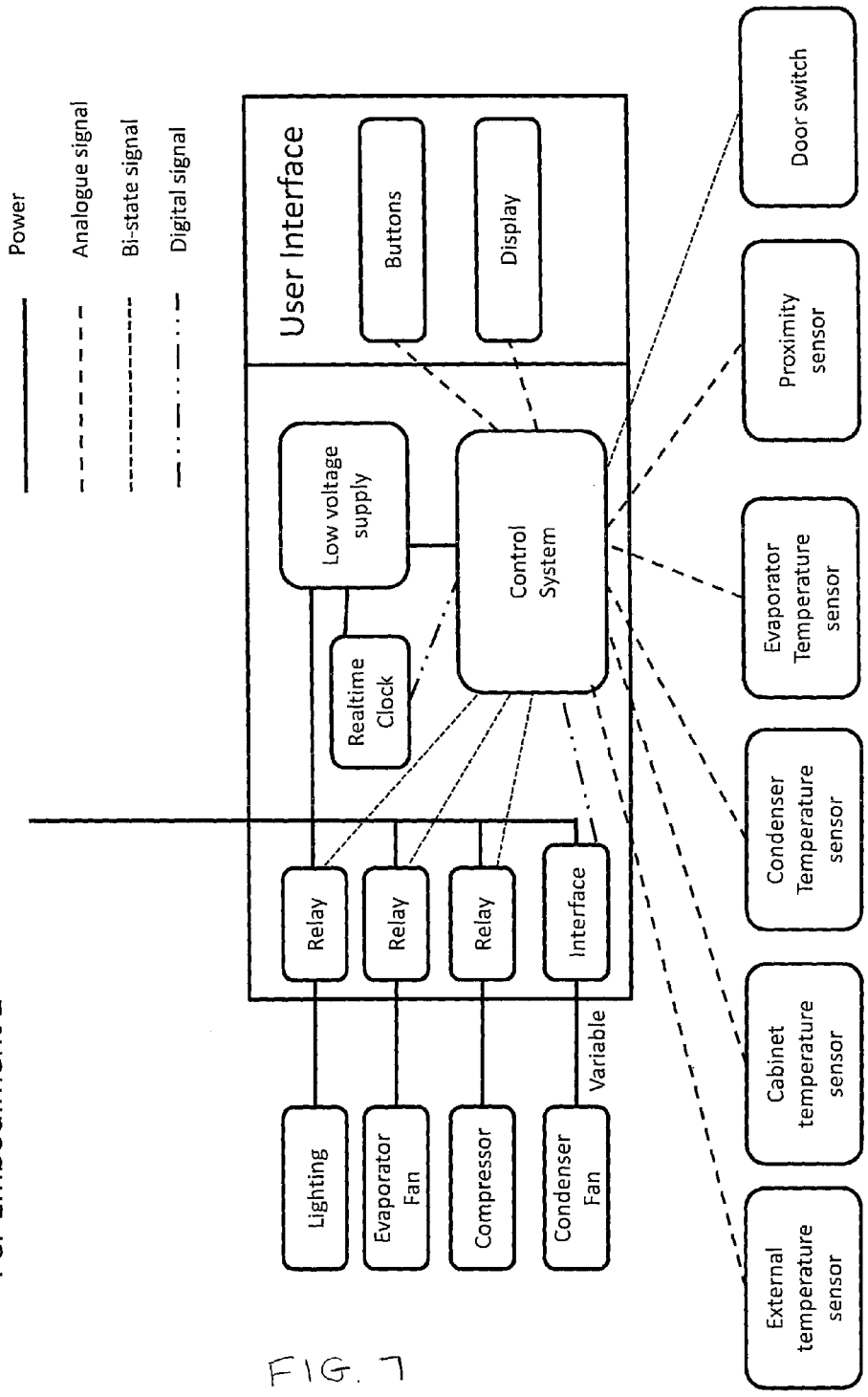
FIG. 7 is a block diagram of refrigeration control system of Embodiment 2

In each of the block diagrams the lines represent the mains AC (solid line), an Analogue signal is represented by a line with large dashes, and the bi-state signal is represented by small dashes (as best seen in FIGS. 6 and 7).

Figure 1:
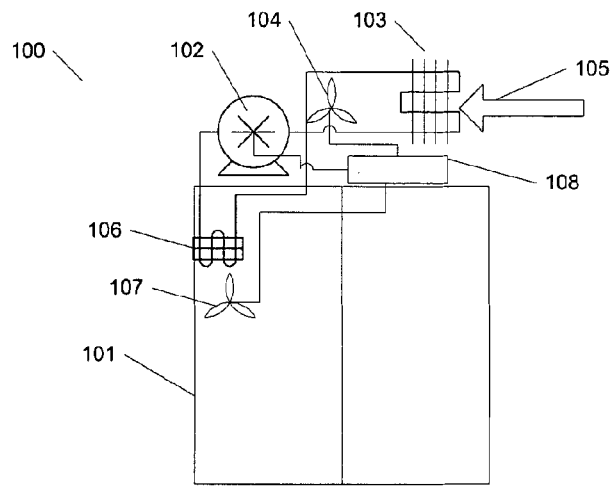
FIG. 1 is a general view of a refrigeration unit.

Referring now to FIG. 1 a refrigeration unit is shown generally at 100 where a refrigeration cabinet with two doors is shown at 101 with, upon the top, a compressor 102 compressing refrigerant and a condenser 103 with an external fan 104 producing airflow 105 circulating through the condenser when operational. Within the cabinet the cooled refrigerant circulates in the evaporator 106 and cooled air is circulated within the cabinet volume by internal fan 107 to cool the cabinet volume below ambient temperature. A refrigeration controller 108 controls the power to compressor 102, condenser fan 104 and evaporator fan 107 and may also control any lighting in cabinet 101, possibly in conjunction with a door switch. A door switch or optical, microwave or sonar sensors (not shown) may also serve to detect customers in the vicinity of the refrigeration unit.

In operation the refrigeration cabinet is required to be maintained between a minimum temperature and a maximum temperature dependent on the product within. To achieve this, the compressor may be switched on and off in the simplest mode, and would cycle the cabinet temperatures up and down between minimum and maximum. In this mode the condenser fan would normally run when the compressor is active but would otherwise be off. The evaporator fan would normally run continually to circulate cooled air, but may stop or reduce to a lower speed when the compressor is off or the door is opened. A less desirable alternative would be to maintain an air curtain when the door is in the OPEN state.

The fans in this mode create a comparatively large amount of acoustic noise due to the fan blade speed and to the high air flow through the condenser and to a lesser extent the evaporator. Additionally it is not the most economic mode as far as power use is concerned because the product inside the cabinet is only required to be at just below the allowable maximum temperature. The most economic mode would maintain the cabinet just below maximum temperature, however this would cycle the compressor on little and often, creating large changes in the acoustic environment and inefficiencies due to the higher starting currents.

To provide a lower acoustic noise it is proposed to control the speed of the fan motors so that when customers are in, or expected to be in, the vicinity of the refrigerator unit the fan speeds are lowered to an "acceptable" level. Additionally, to attempt to maintain the cabinet below maximum temperature when the customers are likely to be opening the door frequently, the condenser fan speed is controlled to a higher level when no customers are detected; bringing the temperature enough below maximum that door opening will not cause maximum temperature to be exceeded.

This requires firstly some form of customer detection and secondly some form of prediction of customer numbers embedded within the controllers. Customer detection may be by any of the well-known forms of sensors or by detecting cabinet door opening. To allow prediction it is proposed to provide a pattern or map of the number of likely or detected customers versus the time. This map may be provided on installation or it may be built up by the refrigeration controller on historical information as it operates.

Additionally there is a compromise between the power used operating in the most efficient mode, and the power used reducing noise when customers are in the vicinity. There is a minimum efficient fan speed beyond which system efficiency drops off rapidly. This minimum efficient fan speed will vary from system to system. This is effectively the speed below which not enough airflow is provided to fully evaporate or condense the refrigerant in the evaporator or condenser. This speed is a function of external ambient (in the case of condenser) and internal ambient (in the case of the evaporator), and to a lesser extent of behaviour of the refrigerant conditions in other parts of the circuit. Fan speed selected in the noise reducing mode may be chosen by a compromise between this minimum efficient fan speed and the speed which produces target noise emissions.

Since the compressor is normally always operating when the condenser fan is on, even at reduced speed, the power efficiency is lessened in this mode so that preferably the condenser fan speed controller is stepless and is able to continuously vary the condenser fan speed to maintain a compromise between acoustic noise and power efficiency which still does not allow the maximum temperature to be exceeded, however the fan speed may be controlled in steps with the minimum number of steps being two—a maximum speed and a minimum speed.

An algorithm for controlling the refrigeration system should specify that the maximum cabinet temperature should never be exceeded, but that the noise level may be lowered when there are persons detected by reducing fan speed (cabinet internal and/or condenser) subject to the cabinet being able to pull down the internal temperature by raising fan speed.

In one implementation, the controller uses a "traffic" parameter and a "pull-down status" parameter, each of which have three levels, to select between three operating modes of the condenser fan, as shown in the table below:

TABLE 1

| | Urgent pull-down (PD = 0) | Slow pull-down (PD = 1) | Hold (PD = 2) |
| --- | --- | --- | --- |
| No traffic (TL = 0) | Max capacity | Max efficiency | Max efficiency |
| Light traffic (TL = 1) | Max capacity | Max efficiency | Min noise |
| Heavy traffic (TL = 2) | Max capacity | Min noise | Min noise |

Table 1 shows three operating modes graded from a 'Max capacity' mode in which the condenser is running, and the condenser and evaporator fans are running at full speed, in other words the normal operating configuration for most refrigerators, a 'Max efficiency' mode in which the system is configured to run the fan at the speed which provides peak efficiency, even if this reduces cooling capacity, and a 'Min noise' mode in which the system is configured mainly for least noise even if that compromises cooling capacity or efficiency.

The "Traffic" level is indicative of the likelihood of people being near the cooler. It may be determined by motion detection or detection of door openings, or may be predicted based upon previous traffic detections over a prolonged period, or upon pre-programmed expected traffic levels.

The "Pull-down status" level is indicative of the divergence of product temperature from its ideal delivery temperature and the urgency of returning the product to ideal temperature. It may be determined by comparison of internal case ambient temperature with a predetermined value (which may be constant or may vary depending on time or other conditions), or by using an algorithm which compares current internal temperature with a desired state a known period in the future, and determines the system's ability to achieve the future state in the available time.

Preferred fan operating modes are as follows:

In Max Capacity mode, fan speed is set to maximise heat transfer across the condenser coil.

In Max Efficiency mode, fan speed is set to minimise power consumption per unit cooling, while providing a target (normally less than maximum available) level of cooling effect.

In Minimum Noise mode, fan speed is set as low as possible consistent with holding an acceptable internal temperature.

In each of these modes the refrigeration unit effectively has an average rate of heat removal. In the Minimum Noise mode this average rate may be insufficient to maintain the cabinet temperature below the required maximum, forcing the refrigeration unit to change to a mode with a higher average rate. In the Max Capacity mode the compressor and evaporator fans are at full speed when running, providing a maximum average rate as the system switches the compressor 106 on and off. In the Max Efficiency mode the rate of heat removal is effectively managed to provide the target temperature at the highest possible efficiency in terms of power used for heat removed.

The following embodiments will be described with reference to the condenser fan but it should be noted that similar consideration can also applied to the evaporator fan, or to both.

Example Embodiment 1: Refer to FIG. 6

In this embodiment, the system is provided with a two-speed condenser fan, a motion detector and thermocouples measuring internal ambient temperature and condenser temperature. No real-time clock or long-term data logging is provided.

Traffic Level Selection (TL):

If M<2, TL=0, else if M<5, TL=1, else TL=2, where M=15 minute rolling average count of motions detected and TL is as defined in the table above Pull-Down Status Selection (PD):

If TI>TIS+6, PD=0, else if TI>TIS+2, PD=1, else PD=2, where TI=internal ambient temperature (deg C.), TIS=pre-set target internal ambient temperature and. PD is as defined in the table above Fan Speed Max capacity mode: S=high, where S=condenser fan speed (from choice of 2 speeds)

Max efficiency mode: if TC>TCS then S=high, else S=low, where TC=measured condenser temperature, TCS=pre-set condenser target temperature Min noise mode: If CS=1, S=low, else S=off, where CS=compressor state (1=on, 0=off)

Example Embodiment 2: Refer to FIG. 7

In this example, the system is provided with a variable-speed condenser fan, a motion detector, a real-time clock (see FIGS. 4 and 7) and a pre-determined 7 day schedule of opening, closing, and peak-traffic times, and corresponding target internal temperatures. The schedule may be pre-programmed at installation or determined by the system controller based on historical usage patterns.

A typical 24 hour period of such a schedule is shown in the table below. In this example, TLL=0 corresponds to store closed periods, TLL=2 corresponds to peak traffic periods around lunchtime and dinnertime rushes. TIS (target internal temperature) is set higher when the store is closed to save power, and lower before peak periods to provide a thermal reserve against frequent door openings.

Internal ambient temperature, external ambient, and condenser temperature sensors are also provided.

TABLE 2

| | Time | | | | | | | | | | | | | | | | | | | | | | | |
|---|---|---|---|---|---|---|---|---|---|---|---|---|---|---|---|---|---|---|---|---|---|---|---|---|
| | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
| TLL | 0 | 0 | 0 | 0 | 0 | 0 | 0 | 0 | 1 | 1 | 1 | 2 | 2 | 2 | 2 | 1 | 1 | 2 | 2 | 2 | 1 | 1 | 0 | 0 |
| TIS | 10 | 10 | 10 | 10 | 10 | 8 | 6 | 4 | 4 | 4 | 2 | 3 | 4 | 4 | 4 | 4 | 2 | 3 | 4 | 4 | 4 | 4 | 10 | 10 |

Traffic Level Selection:

If TLL=0, TL=0, else if TLL=2 or M>4 TL=2, else TL=1, where TLL is obtained by comparing real-time clock with lookup table above, and TL and M are as defined in example 1 above.

Pull-Down Status Selection:

If TI>TIS+6, PD=0, else if TI>TIS+2, PD=1, else PD=2, where TIS is obtained by comparing real-time clock with lookup table above and TI is as defined above.

Fan Speed:

Max capacity mode: S=100%, where S=condenser fan speed

Max efficiency mode: S=PID (TC-TCS (TA)), where TC=measured condenser temperature,
TA=external ambient temperature,
TCS (TA) is a target peak-efficiency condenser temperature calculated as function of ambient temperature (the exact function being dependent on the specific characteristics of the compressor and other system components used), and
PID(x) is a proportional-integral-differential (PID) control function using (x) as the error term, and having gains appropriate to the specific cooler system.

Min noise mode: If CS=1, S=PID (TI-TIS), else S=0, where CS=compressor state (1=on, 0=off), and all other variables are as specified above.

Typically the pattern or map varies between running in the most efficient mode when the retail establishment is closed to running continuously at a lower variable condenser fan speed when the customers are many and the door is opening often. The refrigeration controller is therefore effectively providing at least two different rates of heat removal, namely a first rate at which heat is removed at the maximum rate possible while the compressor is on and at least one lower rate which may be considered the minimum rate. At this latter rate the compressor speed may also be lowered so that the combination gives a rate of heat removal which preferably just maintains the cabinet internal temperature if the door is not opened.

Figure 2:
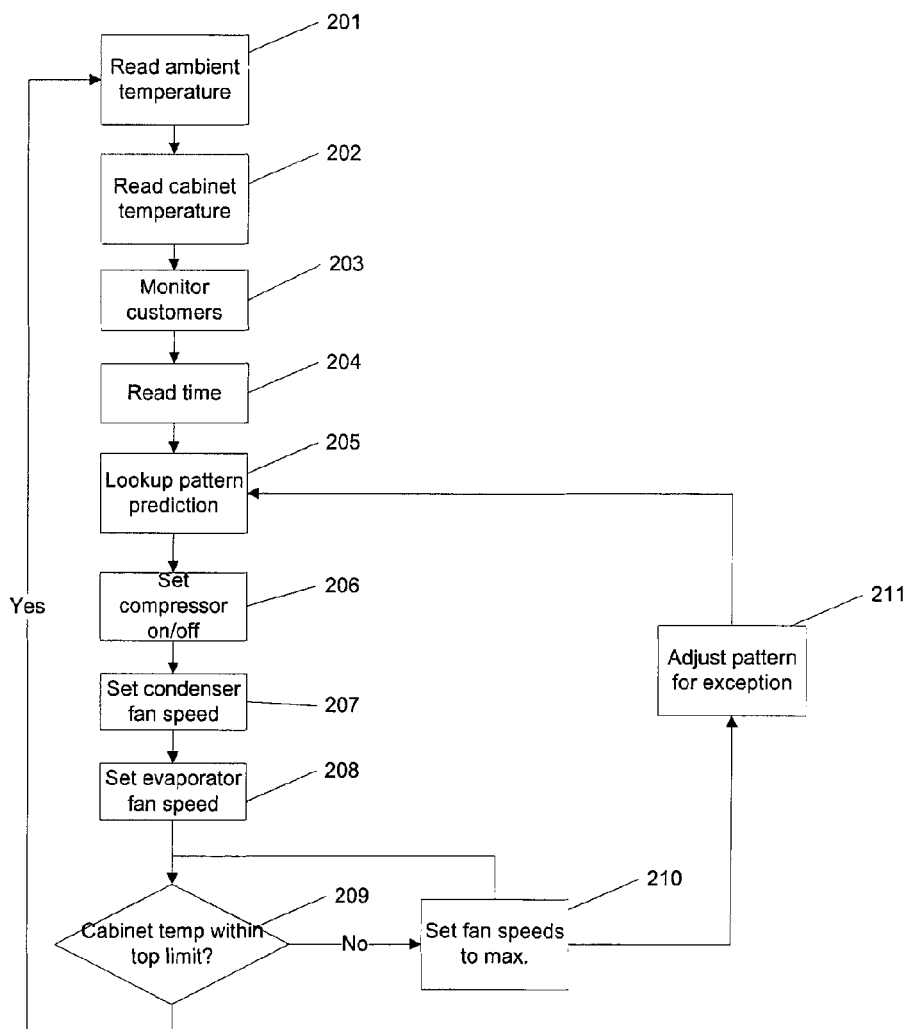
FIG. 2 is a flow diagram of the process of controlling the refrigeration unit.

FIG. 2 shows the simplest typical flow chart implementable as an algorithm in which at 201 the ambient temperature is read, at 202 the internal cabinet temperature is read, at 203 the number of customers present is detected, either by a sensor or inferred from the number of door openings, before at 204 the current time is read and at 205 a pattern or map is read based on these parameters which determines at 206 firstly whether the compressor should be on or off, secondly at 207 what the condenser fan speed should be and at 208 what the evaporator fan speed should be. The cabinet temperature is then read at 209 to confirm it is within the top limit and if not the fan speed is set to maximum at 210 before an adjustment is made to the pattern at 211 to try to avoid the exception next time. The choice of fan speeds may be made from those speeds available, for instance the three speeds of Table 1, the two speeds of Example 1 or the variable speeds of Example 2.

Figure 3:
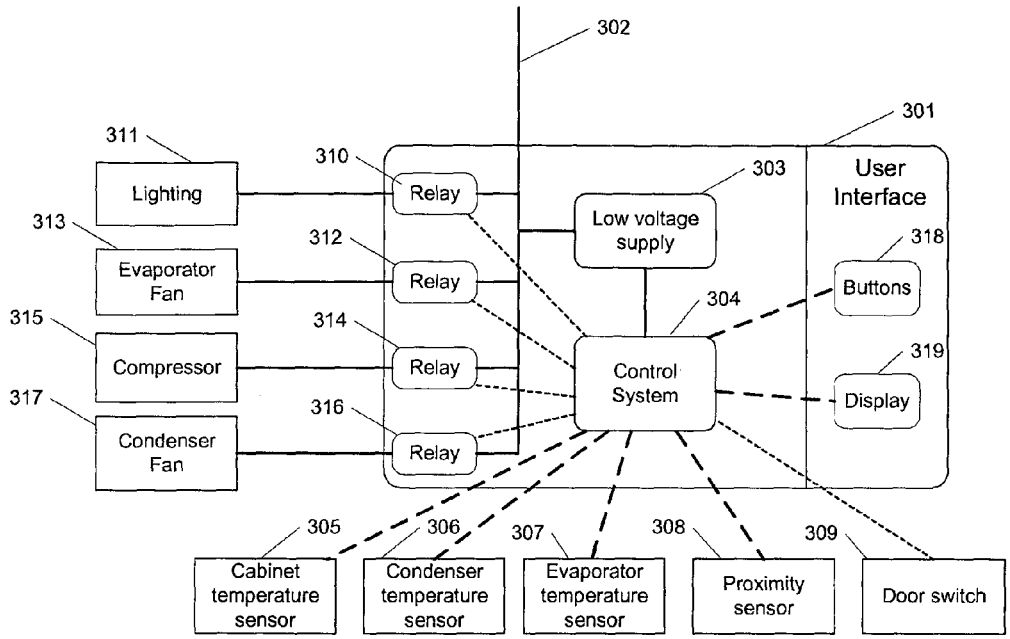
FIG. 3 is a block diagram of a prior art refrigeration controller

FIG. 3 shows a block diagram of a controller typical of the prior art in which a controller 301 has a high voltage AC supply 302 reduced to a control supply voltage by low voltage supply 303. The controller control system, typically a microcomputer with input and output ports, receives input from cabinet temperature sensor 305, condenser temperature sensor 306, evaporator temperature sensor 307, proximity sensor 308 which detects human presence, and door switch 309.

Outputs from the control system created by the flow diagram of FIG. 2 actuate relay 310 to control the lighting 311 in and around the cabinet, relay 312 to control the evaporator fan 313 in a simple on/off manner, relay 314 to control the compressor 315, again in an on/off manner and relay 316 to control condenser fan 317, again in a simple on/off manner.

Figure 4:
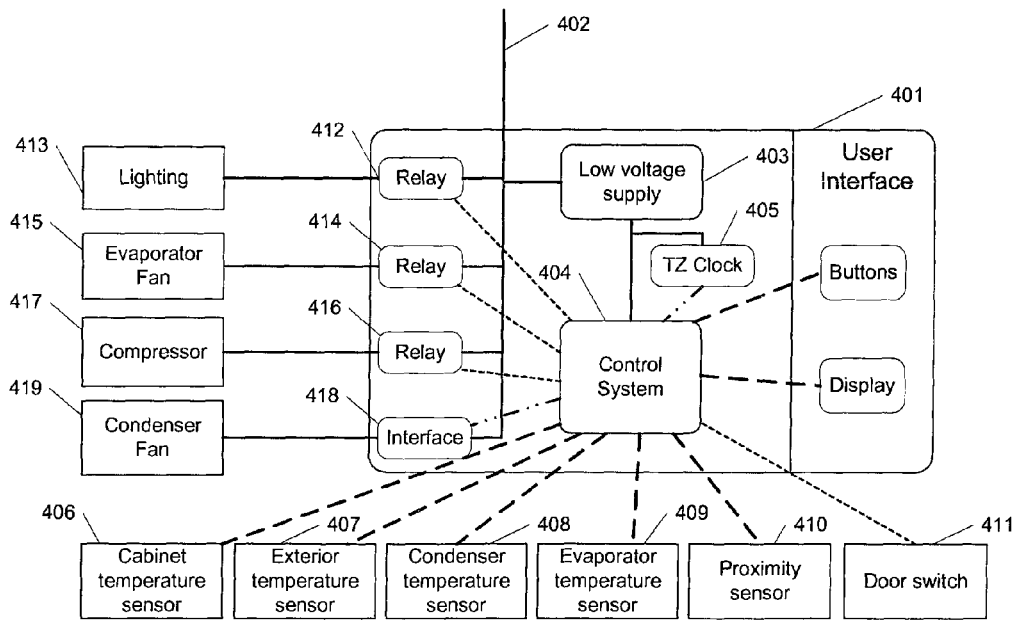
FIG. 4 is a block diagram of a version of the current invention

FIG. 4 shows the inventive controller 401; again with a high voltage AC supply 402 which is reduced to a control supply voltage by low voltage supply 403. Also present is a real time clock 405, set for a specific time zone and the control system 404. The control system receives inputs from a cabinet temperature sensor 406, a temperature sensor for the exterior surroundings of the cabinet 407, a condenser temperature 408, an evaporator temperature sensor 409, a proximity sensor 410 sensitive to human presence and a door switch 411.

The control system activates or deactivates relay 412 to control the lighting 413, relay 414 to control the evaporator fan 415, relay 416 to control the compressor 417 and interface 418 to control the condenser fan. The interface may set the speed of fan 419 at any rotational speed, adjusting it for lower noise as appropriate, consistent with the need to maintain an appropriate temperature and to liquefy the refrigerant.

Control system 404 acts in accordance with FIG. 2 and FIG. 5 to control the outputs in accordance with the inputs as described above and below. In this manner at least the most noisy condenser fan will be reduced in speed under normal conditions to reduce power consumption, and reduced further when a human presence is detected, as far as is compatible with the continued operation of the refrigerator.

Figure 5:
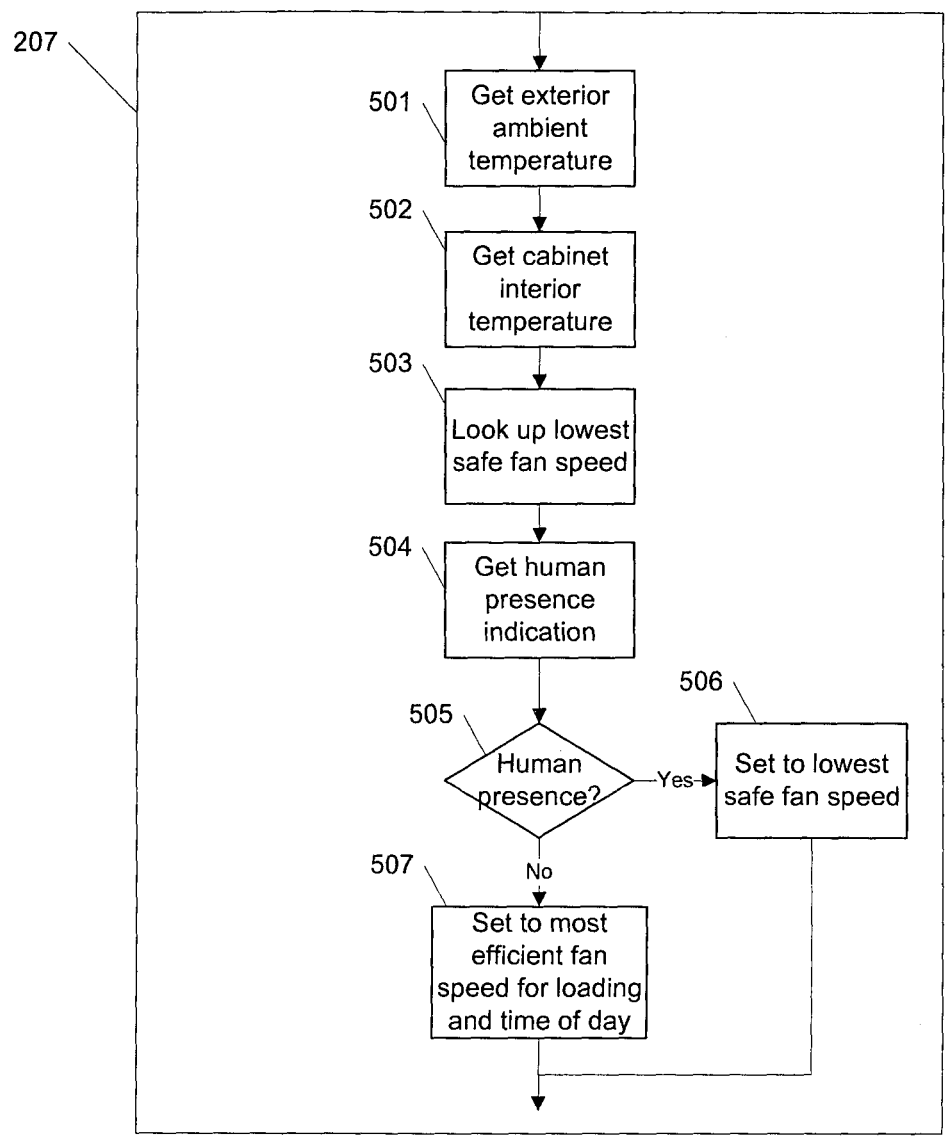
FIG. 5 is a flow diagram of control in accordance with the various parameters

To this end FIG. 5 encompasses a method of detecting when the fan speed of either or both the condenser and evaporator fans can be reduced without either impairing the operation of the refrigerator or allowing the cabinet contents to exceed an allowed maximum temperature.

FIG. 5 shows in more detail the process of item 207 of FIG. 2 in which at 501 the exterior ambient temperature is measured, at 502 the cabinet interior ambient temperature is measured, at 503 a lookup from a table giving the lowest safe condenser fan speed with those temperatures and an estimated cabinet loading is carried out. The table takes into account the load and temperature point at which this refrigeration unit will stop fully condensing the evaporated refrigerant and the rapidity with which the interior temperature is either increasing or decreasing.

The presence or absence of a human is then checked at 504 and if one is present at 505 the fan is set to the lowest safe speed at 506. If not then the fan will be set to the most efficient speed for the loading and time of day at 507, but this speed will not be below the lowest safe speed.

In this way the refrigeration unit is controlled to actively reduce noise when it is required and possible, to reduce power consumption when otherwise possible, but to minimise the probability that product temperature will be far from ideal when product is demanded by customers.

Note that the maximum temperature will normally be exceeded when fresh product is loaded. Mode selection is basically about deciding how urgent it is to deal with this overtemp condition. Effectively the whole thing functions as a feedback control-loop: when error is large apply a large correction (urgent pull-down), and when error is small apply small correction (slow pull-down).

Other factors may be taken into account in determining the algorithm, for instance the loading of product in the cabinet may be taken into account in determining the degree of cooling required when the door is opened often, because the thermal mass of the product will assist in holding the internal temperature or the ambient humidity may be recorded because of the effect on the condenser and condensation on the cabinet exterior and the interior when there is air exchange.

Similarly where the maximum temperature is set higher because no customers are predicted the algorithm in conjunction with the stored pattern of use may be set to lower the maximum temperature some time before the first customer is expected, the time being dependent on the thermal mass of product stored.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular elements of the refrigeration controller may vary dependent on the particular application for which it is used without variation in the spirit and scope of the present invention.

In addition, although the preferred embodiments described herein are directed to refrigeration controllers for use in a retail system, it will be appreciated by those skilled in the art that variations and modifications are possible within the scope of the appended claims.

INDUSTRIAL APPLICABILITY

The refrigeration units of the invention are used in the retail industry and provide both noise reduction and power savings. The present invention is therefore industrially applicable.

The invention claimed is:

1. A refrigeration control system for a refrigeration unit having a refrigeration cabinet volume capable of being maintained at a temperature below ambient temperature, a compressor capable of compressing refrigerant, a condenser capable of cooling the refrigerant, one or more external fans capable of circulating air over the condenser, an evaporator capable of cooling the internal cabinet volume, one or more internal fans capable of circulating air over the evaporator, and a temperature sensor that detects a refrigeration unit internal cabinet temperature, comprising:

a presence sensor that detects the presence of humans at the refrigeration cabinet; and a controller, in communication with the temperature and the presence sensors, that controls the compressor and the internal and external fans responsive to input from the temperature and the presence sensors and anticipated actuation of the temperature and the presence sensors, in accordance with a target temperature of the refrigeration cabinet volume set at the controller, the controller controlling at least one of the external fans between a plurality of operating speeds independently of the operating state (ON or OFF) of the compressor such that, for a given refrigeration cabinet volume target temperature setting, the at least one of the external fans, in the event of detected or anticipated presence of human traffic, operates at a lower speed than in otherwise identical operating conditions in an absence of human traffic, wherein the controller is configured to operate responsive to the temperature and the presence sensors and anticipated actuation of the temperature and the presence sensors such to control the fan speed according to the following operational modes:
a first mode where the fan speed is such to maximize a cooling capacity of the refrigeration unit to achieve the given refrigeration cabinet volume target temperature setting,
a second mode, upon a determination by the controller that a maximized cooling capacity is not required and that human traffic or anticipated presence of human traffic is detected, where the fan speed is slower than in the first mode in order to reduce refrigeration unit noise, and
a third mode, upon a determination by the controller that the maximized cooling capacity is not required and that human traffic is not detected or anticipated, where the fan speed is slower than in the first mode and the compressor is slower than in the first mode such to reduce power consumption of the refrigeration unit.

2. The refrigeration control system as claimed in claim 1, wherein the refrigeration unit has an external ambient temperature sensor and the condenser fan speed is controlled by the controller at least partially as a function of measured external ambient temperature.

3. The refrigeration control system as claimed in claim 1, wherein the controller is further configured to control a speed of the one or more internal fans such that for the given target temperature setting, the one or more internal fans, in the event of detected or anticipated presence of human traffic, operates at a lower speed than in otherwise identical operating conditions in the absence of human traffic.

4. The refrigeration control system as claimed in claim 1, wherein, in the third mode, the fan speed is controlled to be as low as possible consistent with full evaporation and condensation of the refrigerant in the heat exchangers.

5. The refrigeration control system as claimed in claim 1, wherein the controller stores a history of past human presence detected by the presence sensor versus time, and uses the stored history to determine the anticipated presence of human traffic.

6. A method of operating a refrigeration unit that has a refrigeration cabinet with an internal volume thereof to be maintained at a temperature below ambient temperature, a compressor configured for compressing refrigerant, a condenser that cools the refrigerant, one or more external fans configured for circulating air over the condenser, an evaporator configured for cooling the internal volume of the cabinet, a temperature sensor that detects an internal cabinet temperature of the refrigeration unit, and one or more internal fans configured for circulating air over the evaporator, the method comprising the steps of:
providing a presence sensor that detects a presence of humans in the vicinity of the refrigeration cabinet;
providing a controller that controls the compressor and at least one of the internal and external fans responsive to the temperature sensor, the presence sensor, and anticipated actuation of the temperature and the presence sensors;
setting an operative refrigeration cabinet volume target temperature and recording said refrigeration cabinet volume target temperature at the controller;
at the controller, detecting or predicting the presence of human traffic in the vicinity of the refrigeration unit by way of the presence sensor; and
controlling, by way of the controller and independently of the operating state (ON or OFF) of the compressor, a speed of the at least one of the external fans responsive to the temperature and the presence sensors and anticipated actuation of the temperature and the presence sensors,
wherein the controller controls the speed of the at least one of the external fans according to the following operational modes:
a first mode where the speed of the compressor and the speed of the at least one of the external fans is controlled such to maximize a cooling capacity of the refrigeration unit to achieve the refrigeration cabinet volume target temperature,
a second mode, upon a determination by the controller that a maximized cooling capacity is not required and that the presence of human traffic or anticipated presence of human traffic is detected, where the speed of the at least one of the external fans is controlled to be slower than in the first mode in order to reduce refrigeration unit noise, and
a third mode, upon a determination by the controller that the maximized cooling capacity is not required and that the presence of human traffic is not detected or anticipated, where the speed of the at least one of the external fans is controlled to be slower than in the first mode and the compressor is controlled to be slower than in the first mode such to reduce power consumption of the refrigeration unit.

7. A refrigerator, comprising:
a refrigeration controller that controls an interior temperature of the refrigerator in accordance with a user-adjustable target temperature; and
a refrigeration cabinet, that has
an interior configured to be maintained at a temperature below ambient temperature,
a compressor that compresses refrigerant,
a condenser that cools the refrigerant,
one or more external fans that circulate air over the condenser,
an evaporator that cools the interior of the cabinet,
one or more internal fans that circulate air over the evaporator,
a temperature sensor that detects an internal cabinet temperature of the refrigeration unit, and
a human traffic sensor that detects a presence of human traffic in the vicinity of the refrigeration unit,
the refrigeration controller in communication with the temperature sensor and the human traffic sensor, and having a clock function,
the refrigeration controller being responsive to both a detected presence of human traffic from the human traffic sensor, and a predicted presence of human traffic from stored information, and
the refrigeration controller being programmed to control the compressor and at least one of the external fans between two or more operating speeds independently of the operating state (ON or OFF) of the compressor such that, for a given target temperature setting, the at least one of the external fans, in the event of detected or predicted presence of human traffic operates at a lower speed than in otherwise identical operating conditions in an absence of human traffic,
wherein the refrigeration controller is configured to operate responsive to the temperature and the presence sensors and anticipated actuation of the temperature and the presence sensors such to control the operating speed of the at least one of the external fans according to the following operational modes:

a first mode where the speed of the compressor and the speed of the at least one of the external fans is controlled such to maximize a cooling capacity of the refrigeration unit to achieve the refrigeration cabinet volume target temperature, a second mode, upon a determination by the controller that a maximized cooling capacity is not required and that the presence of human traffic or anticipated presence of human traffic is detected, where the speed of the at least one of the external fans is controlled to be slower than in the first mode in order to reduce refrigeration unit noise, and a third mode, upon a determination by the controller that the maximized cooling capacity is not required and that the presence of human traffic is not detected or anticipated, where the speed of the at least one of the external fans is controlled to be slower than in the first mode and the compressor is controlled to be slower than in the first mode such to reduce power consumption of the refrigeration unit.

\* \* \* \* \*